United States Patent [19]

Hausermann

[11] Patent Number: 4,794,808
[45] Date of Patent: Jan. 3, 1989

[54] TRANSMISSION CONTROL

[76] Inventor: Willy Hausermann, Sandbuckweg 5, CH-8157 Dielsdorf, Switzerland

[21] Appl. No.: 88,023

[22] Filed: Aug. 18, 1987

Related U.S. Application Data

[63] Continuation of Ser. No. 690,746, Jan. 11, 1985, abandoned.

[30] Foreign Application Priority Data

Jun. 5, 1984 [CH] Switzerland ............................ 2727/84

[51] Int. Cl.[4] ........................ B60K 20/10; B60K 20/00
[52] U.S. Cl. .......................................... 74/335; 74/475; 74/527
[58] Field of Search ................. 74/335, 336 R, 473 R, 74/475, 483 PB, 477, 527, 844, 866; 180/272; 192/3.58, 0.076; 340/52 F, 53

[56] References Cited

U.S. PATENT DOCUMENTS

| 2,769,941 | 11/1956 | Elliott | 74/527 |
|---|---|---|---|
| 2,943,501 | 7/1960 | Stapleton | 74/527 |
| 2,986,630 | 5/1961 | Maynard | 74/527 |
| 3,021,512 | 2/1962 | Welsh et al. | 74/527 |
| 3,028,926 | 4/1962 | Spicer, Jr. | 74/476 X |
| 3,922,933 | 12/1975 | Sakai et al. | 74/473 R |
| 4,253,348 | 3/1981 | Will et al. | 74/866 |
| 4,271,728 | 6/1981 | Wakamatsu | 74/473 R |
| 4,291,586 | 9/1981 | Buetemeister | 74/473 R X |
| 4,361,060 | 11/1982 | Smyth | 74/752 A X |
| 4,363,249 | 12/1982 | Stugart | 180/272 X |

Primary Examiner—Lawrence Staab
Attorney, Agent, or Firm—Peter K. Kontler

[57] ABSTRACT

A device for accurate and precise selecting of gear ranges in an automatic transmission system. The device has a lever which is movable to several positions each corresponding to a different gear range, a member for correctly positioning the lever in a selected position, a motor which is connected with and can move the lever through the medium of a clutch, and a controller which disengages the clutch when the lever reaches the selected position so that such position can be corrected, if necessary, by the positioning member.

3 Claims, 2 Drawing Sheets

PRIOR ART

TRANSMISSION CONTROL

This application is a continuation, of application Ser. No. 690,746, filed Jan. 11, 1985 abandoned.

FIELD OF THE INVENTION

This invention relates to a an apparatus for accurate selection of the gear step in an automatic vehicle transmission.

BACKGROUND OF THE INVENTION

The usual method of connecting the shift selector control assembly, in a vehicle, to the manual selector shaft of an automatic vehicle transmission system is by means of a cable. However, it is known to replace the cable connection by known devices and methods, which are mostly electropneumatic or electrohydraulic drives, activated from the driver position either electrically or mechanically. In these methods, the driver operates his shift selector control assembly, generating electrical signals which then actuate a pneumatic or hydraulic actuator which drives the manual selector shaft of the automatic vehicle transmission to the proper gear step position. These devices have the disadvantage that faulty shifting may occur due to incorrect positioning of the manual selector shaft by the pneumatic or hydraulic actuator, or by mistakes of the driver. In some instances this may lead to damage in the transmission, for instance if the transmission shifts into reverse while the vehicle is going forward, or if the transmission shifts into first gear while the vehicle is going at high forward speed. In addition, various conditions of the vehicle may impose constraints on the allowable gear steps which may be selected; in such cases selection of an incorrect gear step may cause damage or a dangerous condition.

SUMMARY OF THE INVENTION

It is therefore one of the principal objects of the present invention to devise apparatus for elimination of any erroneous manipulation of the gear manual selector shaft, and which would guarantee precise, accurate selecting at all times. A further object of this invention is to devise a method and an apparatus by means of which, given certain conditions of the vehicle such as,door not closed, or too high speed of rotation of the motor, shifting of the transmission is completely inhibited, that is, no different gear step can be set. In addition, it is a further object of the invention to inform the driver of the reason for the inability to shift gears.

A further object of the invention is to create a method and an apparatus which will do away with the drawbacks of the known gear shifting devices.

In order to implement these and still further objects of the invention, which will more readily become apparent as the description proceeds, the present invention makes use of a closed loop feedback system, comprising a controller, a drive motor, a coupler, and a feedback transducer for measuring the pre-existing position of the manual selector shaft and feeding this information back to the controller for comparison with the newly desired gear step. Thus, if the comparison shows a discrepancy between the two, the controller will cause the drive motor to actuate the transmission system manual selector shaft until it achieves the identical gear step to the desired gear step.

The controller can also be equipped with a computer, such as a microprocessor, which can be provided with a data base and appropriate sensors, enabling it to monitor selected conditions of the vehicle. The controller can be programmed so as to prevent actuation of the manual selector shaft of the transmission system in those instances where the condition of the vehicle would cause damage if the shifting actually took place.

The computer in the controller can also be programmed and connected to a display device in the vehicle, so that the operator can be provided with messages describing the reason for the inability to change the gear step. This would enable the operator to take corrective action and remove the objectionable condition.

A BRIEF DESCRIPTION OF THE DRAWINGS

The invention will be better understood and objects other than those set forth above will become apparent, when consideration is given to the following detailed description thereof. Such description makes reference to the annexed drawings wherein.

DETAILED DESCRIPTION OF THE PREFERRED EMBODIMENTS

Figure 1:
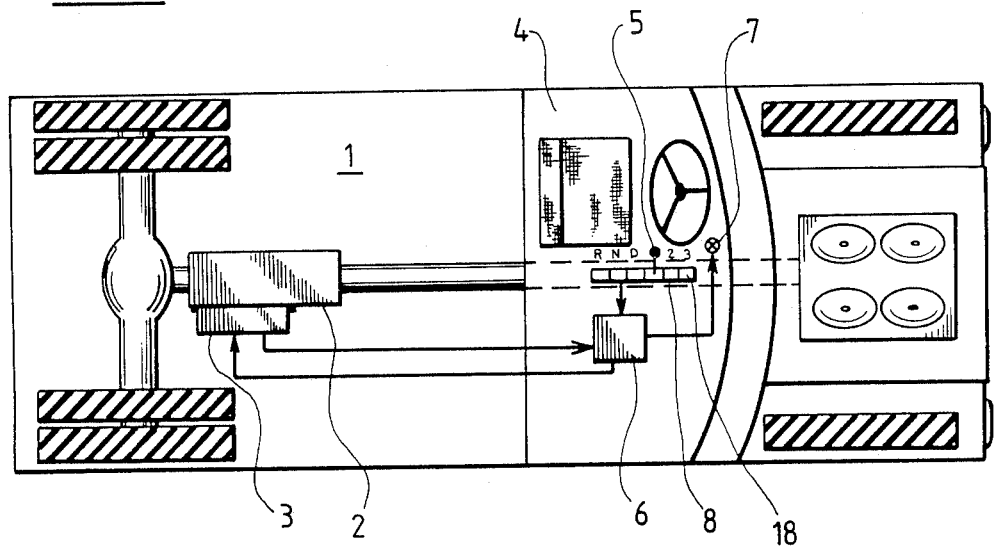
FIG. 1 is a schematic illustration of a vehicle with a gear selecting device.

Describing the drawings, in FIG. 1 there is illustrated a truck or bus 1, equipped with an automatic shifting transmission 2, for example, a transmission of the type MT 754 by Detroit Diesel Allison, to which is attached a gear ratio selecting device 3. In the cab 4 of the truck 1, there is a conventional gear selecting lever 5 to select one of the transmission steps R,N,D, 1, 2, or 3 on the shifting console 8. The cab 4 is also equipped with a controller 6 to control the gear selecting device 3, and an optical or acoustic indicating device 7, electrically connected to the controller 6, to indicate if a gear selection can or cannot be carried out.

The controller 6 is also equipped with a microcomputer of known construction, for example, of the type 8048 manufactured by Intel, Palo Alto, Calif. The microcomputer, furnished with the necessary data base, and appropriately programmed, performs the monitoring and logical functions which determine whether or not and how much to actuate the manual selector shaft of the automatic transmission system. Design and application data for the Intel 8048 microcomputer can be found in Chapters 13–16 of the Micro-controller Handbook—1984, published by Intel Corporation, which are incorporated herein by reference.

Figure 2:
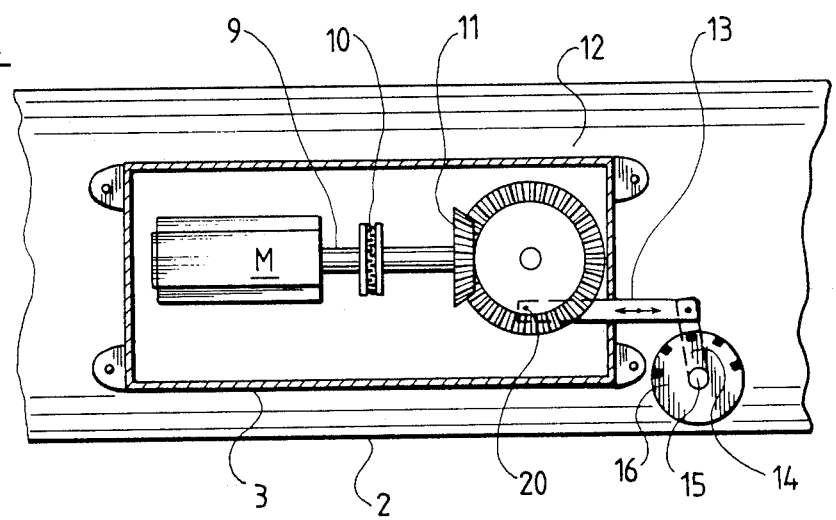
FIG. 2 is a modification of a position monitoring device at the manual selector shaft.
Figure 3:
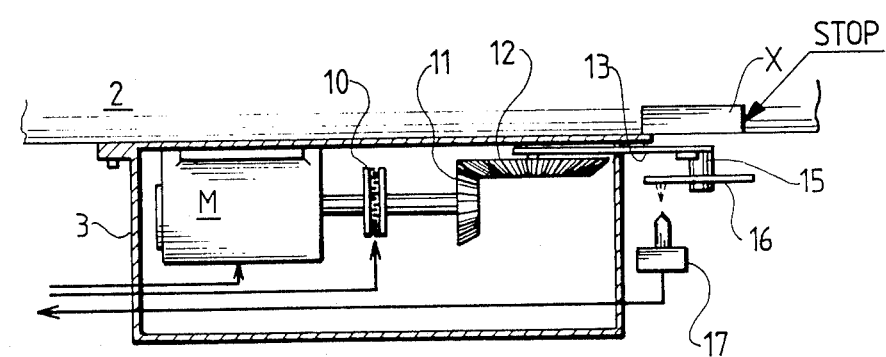
FIG. 3 is a top view of the modification according to FIG. 2.

The gear selecting device 3, which is enclosed in a box and illustrated in FIGS. 2 and 3, comprises a Motor M, the output drive shaft 9 of which is connected to a coupling. The output end of coupling 10 is connected to a first bevel gear 11 which meshes with a second bevel gear 12. A connecting rod 13, which is pivoted on the bevel gear 12 by means of a pin 20, connects the bevel gear 12 with the lever 14 of the manual selector shaft 15 of the automatic transmission system 2. The manual selector shaft 15 is connected to the gear valve which is located within the housing of the automatic transmission system 2. The lever 14 does slightly differ from those used with conventional gear selecting devices, and is supplied together with the kit.

On the manual selector shaft 15, or on the lever 14, or on the bevel gear 12, there is mounted a disc 16 with electronically, magnetically or optically readable codes, for instance black and white optically readable segments, as shown in FIGS. 2 and 3. An appropriate reading device 17, which can convert the coded data into a signal, is arranged in front of the disc 16 and can determine precisely the exact, instantaneous position of the manual selector shaft 15. The motor M, the coupling 10 and the reading device 17 are electrically connected to the controller 6. The coupling 10 can be a fine gear coupling, for example, of the type 86 or 11 manufactured by the firm Binder in Billingen, Germany.

In operation, the driver selects the desired transmission step by operating the lever 5 or push button 18 on the shifting console 8. The signal, so generated is received by the controller 6 and is compared with the feedback signal received from gear selecting device 3. If the pre-existing gear step in the automatic transmission system 2 differs from the desired gear step, a "go" signal is generated in controller 6 which, in turn, generates a signal from controller 6 causing coupling 10 to close. Controller 6 also sends an output signal to the Motor M, driving bevel gears 11 and 12, crank 13 and manual selector shaft 15 toward the position corresponding to the desired gear step.

Figure 4:
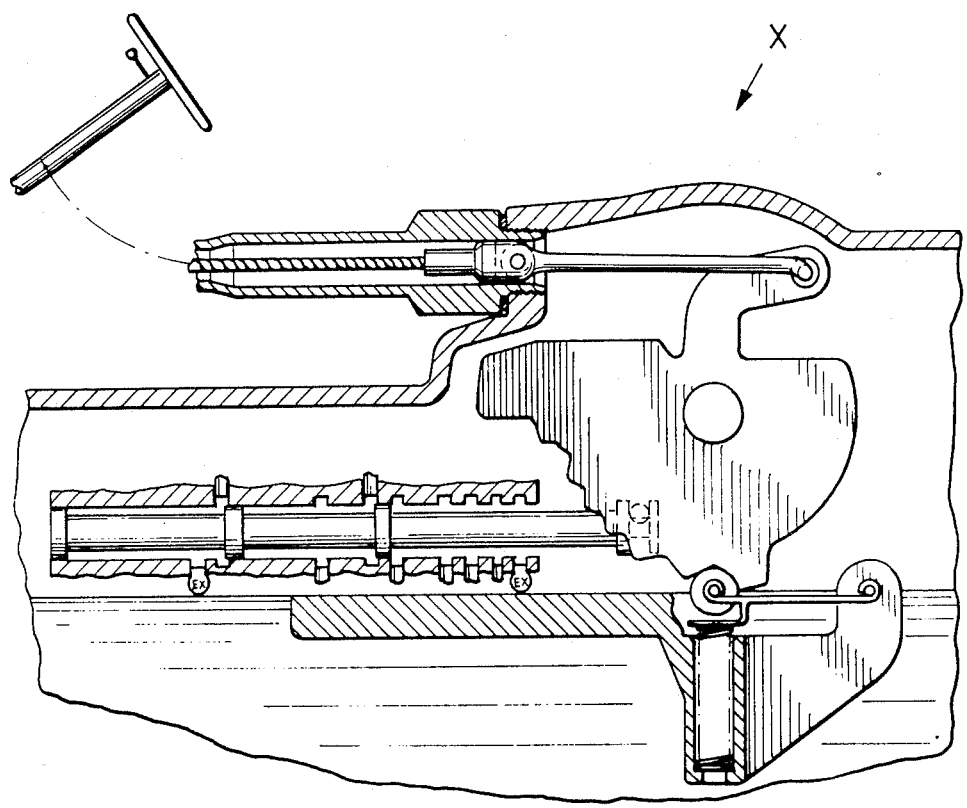
FIG. 4 is a partial sectional view of a transmission showing the stop means.

The position of the manual selector shaft 15 is constantly monitored by means of the code disk 16 through the reading device 17 and communicated to the controller 6. When the desired position is reached, the microcomputer in the controller 6 causes the coupling 10 to uncouple, thereby disconnecting the Motor M from the manual selector shaft 15. Final adjustment of the manual selector shaft 15 is accomplished by the stop means X (FIG. 3) integrated into every automatic transmission 2, which ensures that the manual selector shaft 15 is correctly positioned. A typical stop means is shown in FIG. 4.

Gear selection and shafting can, however, in many cases lead to transmission system damages through carelessness of the driver or breakdown of the vehicle. Thus, shifting must be prevented under certain conditions, for example, where it would endanger the safety of the passengers, or where engine conditions would cause damage if the shifting took place. This would be the case for instance, if shifting were to be attempted when the engine was experiencing an exceesive rate of revolutions per minute.

Therefore, in the present invention, the controller 6 continuously monitors the variables describing the vehicle conditions, such as whether the doors are open or closed, the RPM of the motor, the speed of the vehicle, and whether the vehicle is moving foward or in reverse. The microcomputer, in the controller 6, compares the instantaneous state of these variables with the permissible states of these variables as stored in the data base, and by means of its program decides whether to permit or inhibit the selecting/shifting of gears.

For example, if the vehicle is stationary, and the pre-exisiting gear step is neutral, the controller would prevent shifting into forward or reverse if any of the doors were open. Only if all the doors were closed and/or locked would the controller 6 permit shifting into a new gear step. Similary, if the vehicle were moving very rapidly, the controller 6 would prevent shifting of the gear from high to the lowest gear unless the vehicle speed was first reduced. Furthermore, the controller 6 can be programmed to generate an error message describing the reason for prevention of shifting. This error message can be communicated to a driver by means of an output display device 7, connected to the controller 6, and mounted in the cab 4 of the vehicle.

I wish it to be understood that I do not desire to be limited to the exact details of the method or apparauts described and shown, for obvious modifications will occur to a person skilled in the art.

Having thus described the invention, what I claim as new and desire to be secured by letters patent is as follows:

1. In a motor vehicle, the combination of a transmission having a plurality of gear ranges; means for selecting the ranges of said transmission including a lever movable between a plurality of positions each corresponding to a different gear ranges of said transmission; means for correctly positioning the lever in each of said positions; and means for moving said lever between said positions including a motor, disengageable coupling means interposed between said lever and said motor, and means for disengaging said coupling means upon completed movement of said lever to a selected position so that said positioning means can correctly position the lever in the selected position.

2. In a motor vehicle, the combination of an automatic transmission having a plurality of geare ranges; means for selecting the ranges of said transmission including a selecting member movable between a plurality of positions each corresponding to a different gear ranges of said transmission; means for correctly positioning said selecting member in each of said positions; and means for moving said selecting member between said position including a motor, disengageable coupling means interposed between said selecting member and said motor, and means for disengaging said coupling means upon completed movement of said selecting member to a selected position so that said positioning means can correctly position the selecting member in the selected position.

3. The combination of claim 2, wherein said coupling means comprises a clutch.

* * * * *